US008764146B2

(12) United States Patent
Fukuda et al.

(10) Patent No.: US 8,764,146 B2
(45) Date of Patent: Jul. 1, 2014

(54) PRINTING APPARATUS AND PRINTING METHOD

(71) Applicant: Seiko Epson Corporation, Tokyo (JP)

(72) Inventors: Masako Fukuda, Shiojiri (JP); Tomohiro Sayama, Matsumoto (JP); Hironori Sato, Shiojiri (JP); Nagatoshi Kasahara, Matsumoto (JP); Hiroshi Mukai, Shiojiri (JP); Toshihiro Shinbara, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/853,570

(22) Filed: Mar. 29, 2013

(65) Prior Publication Data

US 2013/0328954 A1 Dec. 12, 2013

(30) Foreign Application Priority Data

Jun. 11, 2012 (JP) ................................ 2012-131631
Mar. 28, 2013 (JP) ................................ 2013-070351

(51) Int. Cl.
*B41J 2/045* (2006.01)
*G01D 11/00* (2006.01)

(52) U.S. Cl.
USPC ............................................. 347/10; 347/100

(58) Field of Classification Search
CPC ............... B41J 2/04581; B41J 2/04588; B41J 2/04541; B41J 2/04593; B41J 2/04548; C09D 11/30; C09D 11/322; C09D 11/38; C09D 11/40; C09D 11/328
USPC .................................................... 347/10, 100
See application file for complete search history.

(56) References Cited

U.S. PATENT DOCUMENTS

2008/0036807 A1* 2/2008 Ihara .............................. 347/11

FOREIGN PATENT DOCUMENTS

JP 2010-221670 10/2010

* cited by examiner

*Primary Examiner* — Lisa M Solomon
(74) *Attorney, Agent, or Firm* — Harness, Dickey & Pierce, P.L.C.

(57) ABSTRACT

A printing apparatus includes a head having a nozzle through which ink that contains thermoplastic resin particles and whose viscosity at 50° C. is equal to or greater than 2.1 mPa·s is discharged, a pressure chamber, and a driving element; an ink non-absorptive medium; a heating unit; and a control unit that applies driving signals to the driving element. In the printing apparatus, a discharge waveform generated by the driving signal includes a first expansion-element that expands the pressure chamber, a contraction-element that contracts the pressure chamber having been expanded by the first expansion-element, a second expansion-element that expands the pressure chamber having been contracted by the contraction-element, a third expansion-element that further expands the pressure chamber having been expanded by the second-expansion element, and a connection-element that connects an end terminal of the second expansion-element with a start terminal of the third expansion-element at the same potential.

5 Claims, 6 Drawing Sheets

PRINTING APPARATUS AND PRINTING METHOD

The entire disclosure of Japanese Patent Application Nos. 2012-131631, filed Jun. 11, 2012 and 2013-070351, filed Mar. 28, 2013 are expressly incorporated by reference herein.

BACKGROUND

1. Technical Field

The present invention relates to printing apparatuses and printing methods.

2. Related Art

An ink jet printer (hereinafter, referred to as a "printer") including a head that discharges ink through a nozzle is widely known as a printing apparatus. Recently, it has been required to printers to print an image on various kinds of media such as paper, cloth, plastic films, and so on. For example, a printer that uses ink containing thermoplastic resin particles is proposed in order to print an image on a non-absorptive medium such as a plastic film that does not absorb ink (e.g., see JP-A-2010-221670). Using ink that contains thermoplastic resin particles makes it possible to form a hard resin film on the medium after the ink is dried and to ensure rub resistance of the printed matter.

An ink droplet that has landed on an ink non-absorptive medium is likely to flow. Therefore, a printer using an ink non-absorptive medium is required to perform printing while heating the medium so as to accelerate the drying of an ink droplet that has landed on the medium and consequently suppress the flowing of the ink droplet. Meanwhile, when an ink droplet is discharged through a nozzle, a minute ink droplet is generated along with a main ink droplet in some case. If this minute ink droplet loses its velocity halfway and floats in the air as mist, there is a case in which the mist adheres to a nozzle opening surface of the head. In the case of a printer using an ink non-absorptive medium as described above, the temperature of the nozzle opening surface of the head becomes high being affected by the heat that heats the medium; accordingly, when ink mist adheres to the nozzle opening surface of the head, the ink is dried and firmly adhered to the nozzle opening surface. As a result, the ink is accumulated on the nozzle opening surface of the head, and the accumulated ink prevents ink droplets from being discharged through the nozzles.

SUMMARY

An advantage of some aspects of the invention is to provide a printing apparatus and a printing method in which an amount of ink that adheres to a nozzle opening surface of a head is reduced.

A printing apparatus according to a principal aspect of the invention includes: a head having a plurality of nozzle through which ink that contains thermoplastic resin particles and whose viscosity at 50° C. is equal to or greater than 2.1 mPa·s is discharged, pressure chamber provided for the nozzle, and driving element provided for the pressure chamber; an ink non-absorptive medium; a heating unit that heats the aforementioned medium; and a control unit that drives the driving element by applying driving signals thereto to expand and contract the pressure chamber corresponding to the respective driving element so as to discharge ink droplets through the nozzle that communicate with the pressure chamber. In the above printing apparatus, a discharge waveform generated by the driving signal includes: a first expansion element that expands the pressure chamber; a contraction element that contracts the pressure chamber having been expanded by the first expansion element; a second expansion element that expands the pressure chamber having been contracted by the contraction element; a third expansion element that further expands the pressure chamber having been expanded by the second expansion element; and a connection element that connects an end terminal of the second expansion element with a start terminal of the third expansion element at the same potential.

Other aspects of the invention will be clarified with reference to the description of this specification and the accompanying drawings hereinafter.

BRIEF DESCRIPTION OF THE DRAWINGS

The invention will be described with reference to the accompanying drawings, wherein like numbers reference like elements.

DESCRIPTION OF EXEMPLARY EMBODIMENTS

Outline of Disclosure

Figure 1A:
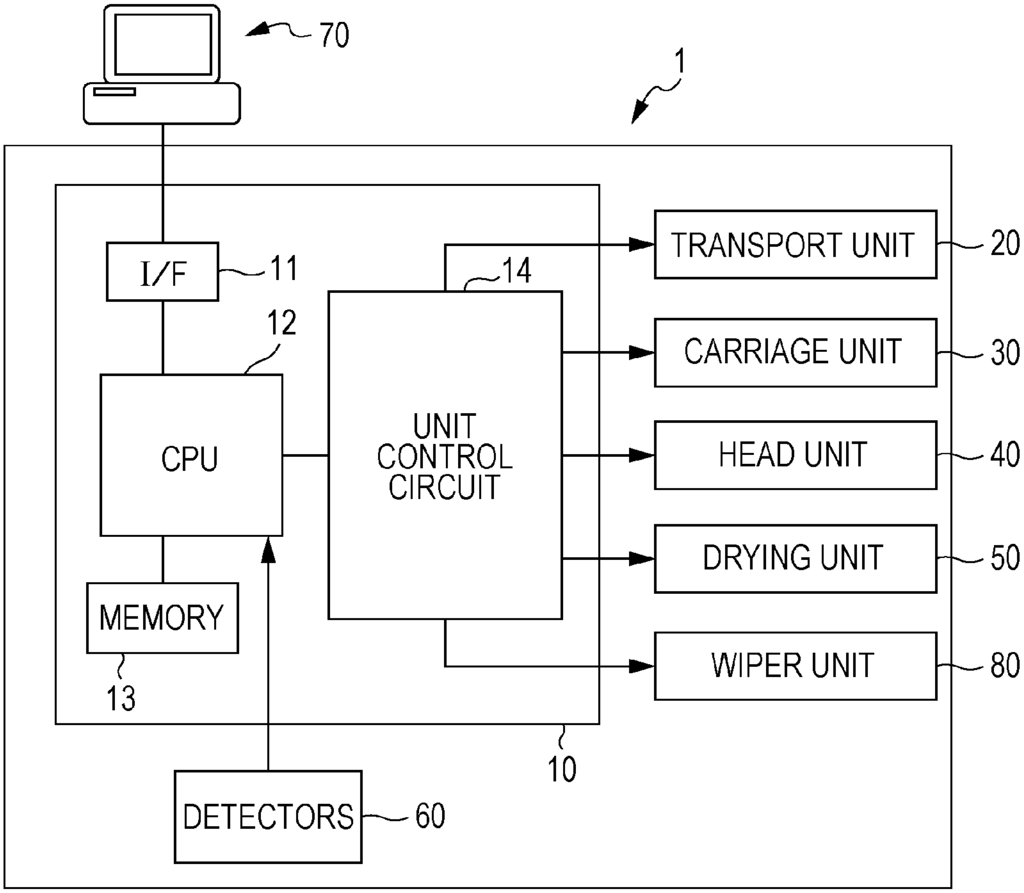
FIG. 1A is a block diagram illustrating the overall configuration of a printing system.

Embodiments of the invention will be explained using the description of this specification and the appended drawings.

A printing apparatus according to an embodiment of the invention includes: a head having a nozzle through which ink that contains thermoplastic resin particles and whose viscosity at 50° C. is equal to or greater than 2.1 mPa·s is discharged, pressure chamber provided for the nozzle, and driving element provided for the pressure chamber; an ink non-absorptive medium; a heating unit that heats the medium; and a control unit that drives the driving element by applying driving signals thereto to expand and contract the pressure chamber corresponding to the respective driving element so as to discharge ink droplets through the nozzle that communicate with the pressure chamber. In the above printing apparatus, a discharge waveform generated by the driving signal includes: a first expansion element that expands the pressure chamber; a contraction element that contracts the pressure chamber having been expanded by the first expansion element; a second expansion element that expands the pressure chamber having been contracted by the contraction element; a third expansion element that further expands the pressure chamber having been expanded by the second expansion element; and a connection element that connects an end terminal of the second expansion element with a start terminal of the third expansion element at the same potential.

According to the above-mentioned printing apparatus, since the generation of a minute droplet can be suppressed by the second and third expansion elements that are separately set, it is possible to reduce the amount of ink that adheres to a nozzle opening surface of the head.

In the printing apparatus according to this embodiment, it is preferable that a wiping member which makes contact with the nozzle opening surface of the head in which opening of the nozzle is provided be further included and that the control unit remove a foreign object having adhered to the nozzle opening surface by relatively moving the wiping member with respect to the nozzle opening surface while the wiping member being in contact with the nozzle opening surface.

According to the above-mentioned printing apparatus, it is possible to wipe off the ink accumulated on the nozzle opening surface so as to suppress a case in which ink droplets are prevented from being discharged through the nozzle by the accumulated ink.

In the printing apparatus according to this embodiment, it is preferable for a time period from an application end of the contraction element to an application end of the third expansion element to be set equal to a natural vibration cycle of ink within the pressure chamber in the discharge waveform.

According to the above-mentioned printing apparatus, it is possible to efficiently damp residual vibration generated in a meniscus of the nozzle so as to suppress the generation of a minute ink droplet.

In the printing apparatus according to this embodiment, it is preferable for the discharge waveform to be set so that a relationship of $T1 < Tc \times 1/2$ holds while a time period from the application end of the contraction element to an application end of the second expansion element is taken as T1 and the natural vibration cycle of ink within the pressure chamber is takes as Tc.

According to the above-mentioned printing apparatus, it is possible to damp the residual vibration generated in the meniscus of the nozzle so as to suppress the generation of a minute ink droplet.

A printing method according to an embodiment of the invention is a printing method of printing an image on an ink non-absorptive medium using a head that has a nozzle through which ink that contains thermoplastic resin particles and whose viscosity at 50° C. is equal to or greater than 2.1 mPa·s is discharged, pressure chamber provided for the nozzle, and driving element provided for the pressure chamber. In the printing method, a driving signal is applied to the driving element for generating a discharge waveform that includes a first expansion element that expands the pressure chamber, a contraction element that contracts the pressure chamber having been expanded by the first expansion element, a second expansion element that expands the pressure chamber having been contracted by the contraction element, a third expansion element that further expands the pressure chamber having been expanded by the second expansion element, and a connection element that connects an end terminal of the second expansion element with a start terminal of the third expansion element at the same potential so as to expand and contract the pressure chamber corresponding to the driving element and to discharge an ink droplet through the nozzle communicating with the pressure chamber onto the medium being heated.

According to the above-mentioned printing method, since the generation of a minute droplet is suppressed by the second and third expansion elements that are separately set, it is possible to reduce the amount of ink that adheres to the nozzle opening surface of the head.

Printing System

Assuming that a "printing apparatus" is an ink jet printer (hereinafter, called a "printer"), an embodiment of the invention will be described using an example of a printing system in which a printer and a computer are connected with each other.

A printer 1 according to this embodiment prints an image on an ink non-absorptive medium. The ink non-absorptive medium is a medium that does not have an ink absorbing layer. As the ink non-absorptive medium, for example, a plastic film that has not experienced surface finishing for ink jet printing, a medium in which plastic coating has been carried out on a base material such as paper, a medium on which a plastic film is bonded, and the like can be cited. Here, as plastics, polyvinyl chloride, polyethylene-telephthalate, polycarbonate, polystyrene, polyurethane, polyethylene, polypropylene, and the like can be cited.

In the printer 1 according to this embodiment, it is preferable that ink which contains thermoplastic resin particles and whose viscosity at 50° C. is equal to or greater than 2.1 mPa·s (hereinafter, also called a "resin ink") be used. As such ink, ink that is disclosed in JP-A-2010-221670 can be cited, for example. A resin ink, when being dried, forms a hard resin film covering a coloring agent on the medium. Accordingly, in the case where an image is printed on an ink non-absorptive medium, it is possible to give rub resistance to the printed image by using a resin ink. Examples of such ink will be described below.

Ink used in this embodiment does not substantially contain glycerin whose boiling point is 290° C. at 1 atmosphere. If ink substantially contains glycerin, drying capability of the ink considerably decreases. As a result, in various types of recording media, especially in an ink non-absorptive or low-absorptive recording medium, not only darkness unevenness of the image is noticeable, but also the fixity of ink cannot be obtained. Moreover, it is preferable for the ink substantially not to contain an alkyl polyol type material whose boiling point is equal to or higher than 280° C. under 1 atmosphere (the above-mentioned glycerin being excluded).

It is to be noted that "not substantially contain" in this specification means that the contained amount of a material is controlled to be less than a value with which the material can bring a sufficiently significant effect. To rephrase in a quantitative manner, it is preferable for glycerin not to be contained at an amount equal to or greater than 1.0 mass % with respect to the total mass of ink (100 mass %), more preferable for the glycerin not to be contained at an amount equal to or greater than 0.5 mass %, further more preferable for the glycerin no to be contained at an amount equal to or greater than 0.1 mass %, still further more preferable for the glycerin not to be contained at an amount equal to or greater than 0.05 mass %, specifically preferable for the glycerin not to be contained at an amount equal to or greater than 0.01 mass %, and the most preferable for the glycerin not to be contained at an amount equal to or greater than 0.001 mass %.

Hereinafter, additive agents (components) that are contained or can be contained in the ink of this embodiment will be described.

The ink of this embodiment may contain a coloring material. The coloring material is selected from a pigment and a dye.

In this embodiment, light stability of the ink can be enhanced by using a pigment as a coloring material. Both an inorganic pigment and an organic pigment can be used as a pigment.

As inorganic pigments, carbon black, iron oxide, titanium oxide, and silicon oxide can be cited, for example; however, the inorganic pigments are not limited thereto.

As organic pigments, the following can be cited, for example: that is, a quinacridone type pigment, a quinacridone-quinone type pigment, a dioxazine type pigment, a phthalocyanine type pigment, an anthrapyrimidine type pigment, an anthanthrone type pigment, an indanthrone type pigment, a flavanthrone type pigment, a perylene type pigment, a diketo pyrrolo pyrrole type pigment, a perinone type pigment, a quinophthalone type pigment, an anthraquinone type pigment, a thioindigo type pigment, a benzimidazolone type pigment, an iso-indolinone type pigment, an azomethine type pigment, and an azo type pigment can be cited; however, the organic pigments are not limited thereto. Specific examples of the organic pigment can be given as follows.

As pigments used in a cyan ink, C.I. Pigment Blue 1, 2, 3, 15, 15:1, 15:2, 15:3, 15:4, 15:6, 15:34, 16, 18, 22, 60, 65, 66, and C.I. Vat Blue 4, 60 can be cited. In particular, it is preferable to use at least any one of C.I. Pigment Blue 15:3 and Pigment Blue 15:4.

As pigments used in a magenta ink, the following can be cited: that is, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254, 264, and C.I. Pigment Violet 19, 23, 32, 33, 36, 38, 43, 50. In particular, it is preferable for one or more types of pigments to be selected from a group consisting of C.I. Pigment Red 122, C.I. Pigment Red 202, and C.I. Pigment Violet 19.

As pigments used in a yellow ink, the following can be cited: that is, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, 180, 185, and 213. In particular, it is preferable for one or more types of pigments to be selected from a group consisting of C.I. Pigment Yellow 74, 155, and 213.

It is to be noted that known pigments can be cited as pigments that are used in other color inks than the color inks described above, such as a green ink, an orange ink, and the like.

It is preferable that the mean particle diameter of a pigment be equal to or less than 250 nm so as to suppress clogging in the nozzles and to more appropriately ensure the stability of ink discharging. Note that the mean particle diameter in this embodiment is determined on a volumetric basis. The measurement thereof can be carried out using a particle size distribution measuring instrument whose measurement principle is based on a laser diffraction and scattering method, for example. As a particle size distribution measuring instrument, for example, a particle size distribution analyzer whose measurement principle is based on a dynamic light scattering method can be cited (e.g., Microtrac UPA manufactured by Nikkiso Co., Ltd).

Dyes can be used as coloring materials in this embodiment. An acid dye, a direct dye, a reactive dye, and a basic dye can be used as dyes; however, the dyes are not limited thereto.

It is preferable for the contained amount of a coloring material to be equal to or greater than 0.4 mass % and equal to or less than 12 mass % with respect to the total mass of ink (100 mass %), and is more preferable for the contained amount of the coloring material to be equal to or greater than 2 mass % and equal to or less than 5 mass %.

The ink used in this embodiment contains resin. Since the ink contains resin, a resin film is formed on a recording-target medium; as a result, the ink is sufficiently fixed on the recording-target medium, and an effect that the rub resistance of the image is enhanced can be mainly obtained. Accordingly, it is preferable for a resin emulsion to be a thermoplastic resin.

It is preferable for a heat distortion temperature of resin to be equal to or higher than 40° C., so that clogging of the head is unlikely to occur and a favorable effect that the recorded matter can have the rub resistance can be obtained. It is more preferable for the temperature to be equal to or higher than 60° C.

Here, a "heat distortion temperature" in this specification is a temperature value represented by a glass transition temperature (Tg) or a minimum film forming temperature (MFT). That is to say, "a heat distortion temperature is equal to or higher than 40° C." means that it is sufficient that either a Tg or an MFT is equal to or higher than 40° C. Because superiority/inferiority in a re-dispersion property of resin can be grasped more easily by the MFT than by the Tg, it is preferable for the heat distortion temperature to be represented by the MFT. When ink containing a resin with an excellent re-dispersion property is used, a head 41 is unlikely to be clogged because the ink does not adhere thereto.

The Tg in this specification is indicated by a value obtained through the measurement with a differential scanning calorimetry. The MFT in this specification is indicated by a value obtained through the measurement with the ISO 2115:1996 (title: Plastics—Polymer dispersions—Determination of white point temperature and minimum film-forming temperature).

As specific examples of the above-mentioned thermoplastic resin, the following can be cited: that is, methacrylic/acrylic type polymers such as polyacrylic/methacrylic acid ester or its copolymer, polyacrylonitrile or its copolymer, polycyanoacrylate, polyacrylamide, and polyacrylic/methacrylic acid; polyolefin type polymers such as polyethylene, polypropylene, polybutene, polyisobutylene, polystyrene, a copolymer of these materials, petroleum resin, coumarone-indene resin, and terpene resin; vinyl acetate or vinyl alcohol type polymers such as polyvinyl acetate or its copolymer, polyvinyl alcohol, polyvinyl acetal, and polyvinyl ether; halogen-containing type polymers such as polyvinyl chloride or its copolymer, polyvinylidene chloride, fluororesin, and fluororubber; nitrogen-containing vinyl type polymers such as polyvinyl carbazole, polyvinyl-pyrrolidone or its copolymer, polyvinyl-pyridine, and polyvinyl-imidazole; diene type polymers such as polybutadiene or its copolymer, polychloroprene, and polyisoprene (butyl rubber); other ring-opening polymerization type resins; condensation polymerization type resins; and natural polymeric resins. Note that the thermoplastic resin of the invention is not limited to the above examples.

It is preferable for the contained amount of resin to fall within a range of 1 mass % to 30 mass % with respect to the total mass of ink (100 mass %), and is more preferable to fall within a range of 1 mass % to 5 mass %. If the contained amount is within the above ranges, glossiness and the rub resistance of the formed image can be further appropriately enhanced.

As the resins that may be contained in the above-mentioned ink, a resin dispersant, a resin emulsion, wax, and the like can be cited, for example.

The ink used in this embodiment may contain a resin emulsion. When a recording-target medium is heated, a resin emulsion forms a resin film preferably together with wax (emulsion) so that an effect that the ink is sufficiently fixed on the recording-target medium and rub resistance of the image is appropriately enhanced can be obtained. The above-mentioned effect makes the recorded matter which has been recorded using ink that contains the resin emulsion have an excellent rub resistance particularly on an ink non-absorptive or low-absorptive recording-target medium.

A resin emulsion that functions as a binder is contained in ink being in an emulsion state. By making the resin emulsion that functions as a binder be contained in ink being in an emulsion state, it becomes easy to adjust the viscosity of ink into an appropriate range in an ink jet recording system, and an excellent stability of ink preservation and an excellent stability of ink discharge can be obtained.

As the resin emulsions, the following can be cited, for example: that is, methacrylic/acrylic acid, methacrylic/acrylic acid ester, acrylonitrile, cyanoacrylate, acrylamide, olefin, styrene, vinyl acetate, vinyl chloride, vinyl alcohol, vinyl ether, vinyl-pyrrolidone, vinyl-pyridine, vinyl carbazole, vinyl-imidazole, a homopolymer or copolymer of vinylidene chloride, fluororesin, and natural resins; however, note that the resin emulsions of the invention are not limited to the above examples. Of the above-cited materials, at least any one of a methacrylic/acrylic type resin and a styrene-methacrylic/acrylic acid copolymer type resin is preferable, at least any one of the acrylic type resin and the styrene-acrylic acid copolymer type resin is more preferable, and the styrene-acrylic acid copolymer type resin is further more preferable. The above copolymers may take any forms of a random copolymer, a block copolymer, an alternating copolymer, and a graft copolymer.

In order to further appropriately enhance the stability of ink preservation and the stability of ink discharge, it is preferable for the mean particle diameter of a resin emulsion to fall within a range of 5 nm to 400 nm, and is more preferable to fall within a range of 20 nm to 300 nm.

Of the resins, it is preferable for the contained amount of a resin emulsion to fall within a range of 0.5 to 7 mass % with respect to the total mass of ink (100 mass %). If the contained amount is within the above range, the solid content concentration can be lowered, and consequently the stability of ink discharge can be further appropriately enhanced.

The ink used in this embodiment may contain wax. By containing wax, the ink can be more appropriately fixed on an ink non-absorptive or low-absorptive recording-target medium. Of various types of wax, an emulsion type of wax is preferable. As the wax, polyethylene wax, paraffin wax, and polyolefin wax can be cited, for example; however, the wax of the invention is not limited to the wax cited above. Of the above-cited wax, the polyethylene wax, which will be explained in detail later, is particularly preferable.

In this specification, "wax" mainly means a material in which solid wax particles are dispersed in water using a surfactant which will be explained later.

By containing the polyethylene wax, the ink can have an excellent rub resistance.

In order to further appropriately enhance the stability of ink preservation and the stability of ink discharge, it is preferable for the mean particle diameter of the polyethylene wax to fall within a range of 5 nm to 400 nm, and is more preferable to fall within a range of 50 nm to 200 nm.

It is preferable for the contained amount of polyethylene wax (in terms of solid content) to fall within a range of 0.1 to 3 mass % with respect to the total mass of ink (100 mass %), is more preferable to fall within a range of 0.3 to 3 mass %, and is further more preferable to fall within a range of 0.3 to 1.5 mass %, respectively. If the contained amount is within the above ranges, the ink can be appropriately solidified and fixed on an ink non-absorptive or low-absorptive recording-target medium, and the stability of ink preservation and the stability of ink discharge can be made further excellent.

The ink used in this embodiment may include a surfactant. As the surfactant, a non-ionic surfactant can be cited, for example; however, the surfactant of the invention is not limited to the non-ionic surfactant. The non-ionic surfactant causes ink to spread uniformly on a recording-target medium. Accordingly, in the case where ink jet recording is performed using ink that contains a non-ionic surfactant, a high-definition image with little bleeding can be obtained. As such non-ionic surfactant, a silicon type, polyoxyethylene alkyl ether type, polyoxypropylene alkyl ether type, polycyclic phenyl ether type, sorbitan derivative, or fluorine type surfactant can be exemplified; however, the non-ionic surfactant of the invention is not limited to the above exemplified ones. Of the above-exemplified surfactants, the silicon type surfactant is particularly preferable.

In order to further appropriately enhance the stability of ink preservation and the stability of ink discharge, it is preferable for the contained amount of a surfactant to fall within a range of equal to or greater than 0.1 mass % and equal to or less than 3 mass % with respect to the total mass of ink (100 mass %).

The ink used in this embodiment may contain water. In particular, in the case where the ink is a water-based ink, water is a main medium of the ink and is a component that evaporates and scatters when a recording-target medium is heated in the ink jet recording.

The ink used in this embodiment may contain a known volatile water-soluble organic solvent. However, as described above, the ink of this embodiment does not substantially contain glycerin (whose boiling point is 290° C. at one atmosphere), which is a type of organic solvent, and it is preferable for the ink not to substantially contain an alkyl polyol type material whose boiling point is equal to or higher than 280° C. under 1 atmosphere (the above-mentioned glycerin being excluded).

The ink used in this embodiment may further contain, in addition to the above-mentioned components, a preservative-fungicide, a rust-preventive agent, a chelating agent, or the like.

Ink compositions of this embodiment may preferably contain a polar aprotic solvent. Containing the polar aprotic solvent makes it possible to dissolve the aforementioned resin particles contained in the ink so that the clogging of nozzles is effectively prevented when the ink jet recording is performed. In addition, since the polar aprotic solvent has a property that dissolves a recording medium such as vinyl chloride or the like, the adhering property of the image to the recording medium is further enhanced.

With regard to the polar aprotic solvent, it is preferable that one or more types of polar aprotic solvents be contained, selected from a group consisting of pyrrolidone, lactone, sulfoxide, imidazolidinone, sulforane, urea derivative, dialkylamide, cyclic ether, and amide ether types; however, the polar aprotic solvent of the invention is not limited to the above-mentioned solvents. As representative examples of the pyrrolidone type solvent, 2-pyrrolidone, N-methyl-2-pyrrolidone, and N-ethyl-2-pyrrolidone can be cited; as representative examples of the lactone type solvent, γ-butyrolactone, γ-valerolactone, and ϵ-caprolacton can be cited; as representative examples of the sulfoxide type solvent, dimethyl sulfoxide and tetramethylene sulfoxide can be cited; as representative examples of the imidazolidinone type solvent, 1,3-dimetyl-2-imidazolidinone can be cited; as representative examples of the sulforane type solvent, sulforane and dimethyl sulforane can be cited; as representative examples of the urea derivative type solvent, dimethyl urea, 1,1,3,3-tetramethyl urea can be cited; as representative examples of the dialkylamide type solvent, dimethylformamide and dimetylacetamide can be cited; and as representative examples of the cyclic ether type solvent, 1,4-dioxane and tetrahydrofuran can be cited. Of the solvents cited above, the types of pyrrolidone, lactone, sulfoxide and amide ether are particularly preferable from the viewpoint of the above-mentioned effect, and further 2-pyrrolidone is the most preferable.

It is preferable for the contained amount of the polar aprotic solvent to fall within a range of 3 to 30 mass % with respect to the total mass of ink (100 mass %), and is more preferable to fall within a range of 8 to 20 mass %.

Figure 1B:
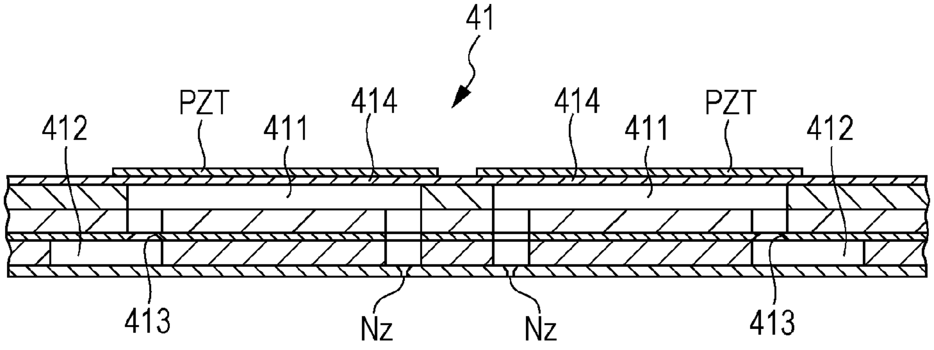
FIG. 1B is a descriptive cross-sectional view schematically illustrating the structure of a head.
Figure 2A:
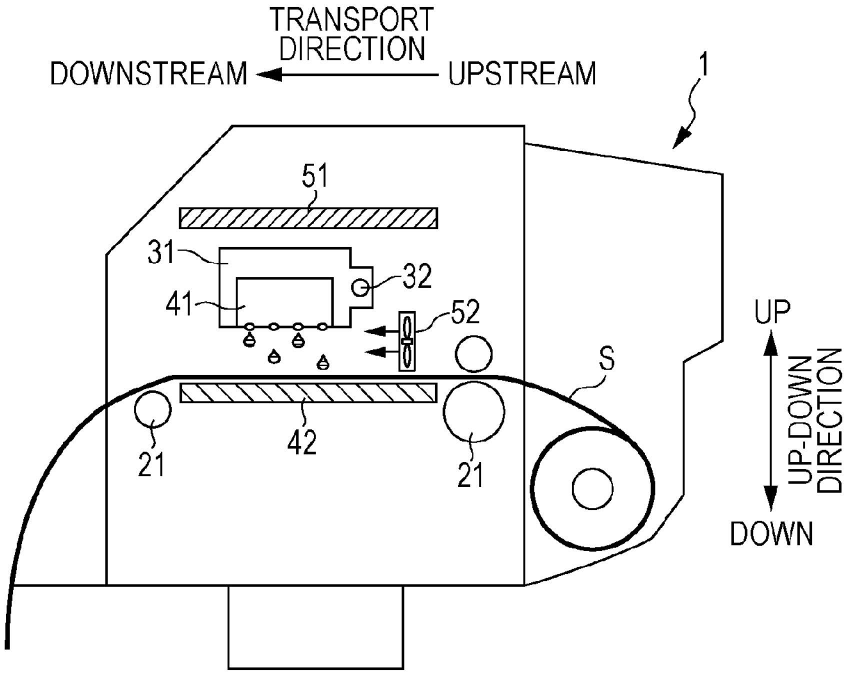
FIG. 2A is a schematic cross-sectional view of a printer.
Figure 2B:
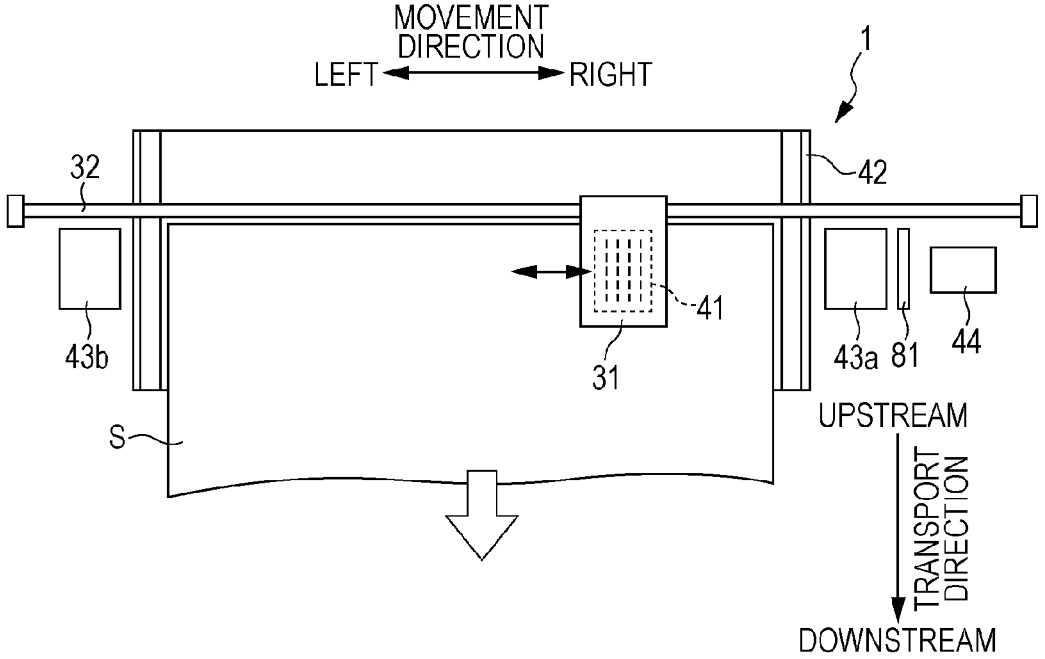
FIG. 2B is a schematic top view of the printer.

FIG. 1A is a block diagram illustrating the overall configuration of a printing system, and FIG. 1B is a schematic cross-sectional view for explaining the structure of the head 41 (a part thereof). FIG. 2A is a schematic cross-sectional view of the printer 1 when viewed from a movement direction of the head 41, and FIG. 2B is a schematic top view of the printer 1. The printer 1 includes a controller 10, a transport unit 20, a carriage unit 30, a head unit 40, a drying unit 50, a wiper unit 80, and detectors 60. The printer 1 is communicably connected with a computer 70; print data for making the printer 1 print an image is created by a printer driver installed in the computer 70 and is sent to the printer 1.

The controller 10 provided in the printer 1 is a controller that performs the overall control in the printer 1. An interface unit 11 sends/receives data to/from the computer 70 as an external device. A CPU 12 is an arithmetic processing unit that performs the overall control of the printer 1 and controls each unit via a unit control circuit 14. A memory 13 is a memory unit that ensures an area for storing programs of the CPU 12, a working area, and so on. The detectors 60 are a group of detectors that monitor a state of inside of the printer 1 and output a monitored detection result to the controller 10.

The transport unit 20 is a unit that sets a medium S (ink non-absorptive medium), which is an image-printing target, to a position where printing can be carried out using a transport roller 21, and transports the medium S to the downstream side in a transport direction of the medium S. A continuous sheet that is wound in a roll is illustrated in FIG. 2A; however, the medium is not limited thereto and a medium having been cut into a predetermined size may be used.

The carriage unit 30 is a unit that moves the head 41 mounted on a carriage 31 along a guide rail 32 in the movement direction, which is a direction intersecting with (generally, orthogonal to) the transport direction of the medium S.

The head unit 40 includes the head 41 that discharges ink onto the medium S, a platen 42 that supports the medium S from the reverse side thereof, ink receptors 43_a_ and 43_b_, and a cap 44. As shown in FIG. 1B, the head 41 includes a plurality of nozzles Nz through which ink is discharged, pressure chambers 411 provided for each of the nozzles Nz, common ink chambers 412 provided for each color of ink, ink supply channels 413 that connect the pressure chambers 411 and the common ink chambers 412, and piezoelectric elements PZT (equivalent to the driving elements) provided for each of the nozzles Nz (for each of the pressure chambers 411). The common ink chambers 412 communicate with a plurality of pressure chambers 411 via the ink supply channels 413; each of the pressure chambers 411 communicates with the corresponding nozzle Nz; ink stored in an ink cartridge is supplied to the common ink chamber 412 first, and thereafter is moved to the pressure chamber 411 so as to be discharged through the nozzle Nz.

In the head 41, openings of the nozzles Nz are formed, and also formed is a nozzle opening surface where nozzle rows in which the nozzle openings are aligned and each of which is provided for each color of ink to be discharged are arranged. For example, a black nozzle row for discharging a black ink, a cyan nozzle row for discharging a cyan ink, a magenta nozzle row for discharging a magenta ink, and a yellow nozzle row for discharging a yellow ink, and the like are configured.

The piezoelectric element PZT is bonded to an elastic plate 414 that configures the pressure chamber 411 corresponding to the stated piezoelectric element PZT. When a discharge waveform Wa (shown in FIG. 3A explained later) generated in response to a drive signal COM outputted from the controller 10 (equivalent to the control unit) is applied to the piezoelectric element PZT, an amount of flexure of the piezoelectric element PZT toward the pressure chamber 411 changes in accordance with a potential of the discharge waveform Wa. As a result, a volume of the pressure chamber 411 is changed (the pressure chamber 411 is expanded/contracted) so that a change in pressure occurs in the ink within the pressure chamber 411. This makes an ink droplet be discharged through the nozzle Nz communicating with the above pressure chamber 411.

The ink receptors 43_a_, 43_b_ and the cap 44 are disposed in non-print regions (that is, in the regions where the medium S does not pass) in the movement direction of the head 41, and are arranged at the positions therein capable of facing the nozzle opening surface of the head 41 that moves in the movement direction. The ink receptors 43_a_ and 43_b_ receive ink that is discharged through the nozzles Nz during a flushing process. The cap 44 adheres tightly to the nozzle opening surface of the head 41 in a cleaning operation during which ink is sucked from the nozzles Nz by a pump, adheres tightly to the nozzle opening surface of the head 41 to seal the nozzle openings at the time when printing is stopped so as to suppress the evaporation of the ink solvent from the nozzles Nz, and so on.

The drying unit 50 is a unit that dries ink which has landed on the medium S and that includes a heater 51 (e.g., an infrared heater) and a fan 52. As shown in FIG. 2A, the heater 51 (equivalent to the heating unit) is arranged above the carriage 31 and the head 41, is disposed at a position opposed to the platen 42, and heats the whole area of the medium S supported by the platen 42. The fan 52 supplies an air flow between the nozzle opening surface of the head 41 and the medium S.

As described above, the printer 1 of this embodiment prints an image by discharging a resin ink onto the ink non-absorptive medium S. The resin ink that has landed on the ink non-absorptive medium S is likely to flow on the medium S. That is, if the resin ink is not appropriately dried to be fixed at a position where the resin ink has landed, a desired image cannot be printed. Accordingly, the heater 51 heats the medium S and the fan 52 sends the wind to blow against the resin ink on the medium S, whereby the resin ink having landed on the medium S is dried more quickly so as to be prevented from flowing on the medium S.

It is possible to suppress unevenness of the heating carried out by the heater 51 with the wind that is sent by the fan 52. Further, it is preferable for a surface temperature of the medium S to be equal to or higher than 45° C. and equal to or less than 60° C. In addition, to prevent overheating of the head 41 by the heat of the heater 51, it is preferable that a heat insulator, a heat dissipation material, or the like be provided in the carriage 31 except a portion for the nozzle opening surface. In this embodiment, although the medium S is heated from above the head 41, the invention is not limited thereto and the medium S may be heated from the lower side thereof by providing a heater within the platen 42. Furthermore, the medium S may be heated at a position on the upstream side from the platen 42 in the transport direction before printing is carried out on the medium S, or may be heated at a position on the downstream side from the platen 42 in the transport direction after printing has been carried out on the medium S. Moreover, the fan 52 may not be provided.

In the printer 1 having the above-described configuration, the controller 10 alternately repeats the following two operations: that is, a discharge operation that discharges ink droplets through the nozzles Nz while moving the head 41 in the movement direction by the carriage 31; the other one is a transport operation that transports the medium S toward the downstream side in the transport direction by the transport unit 20. As a result, because the positions of the dots formed in a foregoing discharge operation and the positions of the dots formed in a subsequent discharge operation are different from each other, a two-dimensional image is printed on the medium S. Note that in the following description, an operation in which the head 41 moves once in the movement direction is also referred to as a "pass".

Ink Mist Problem and Solution

Figure 3A:
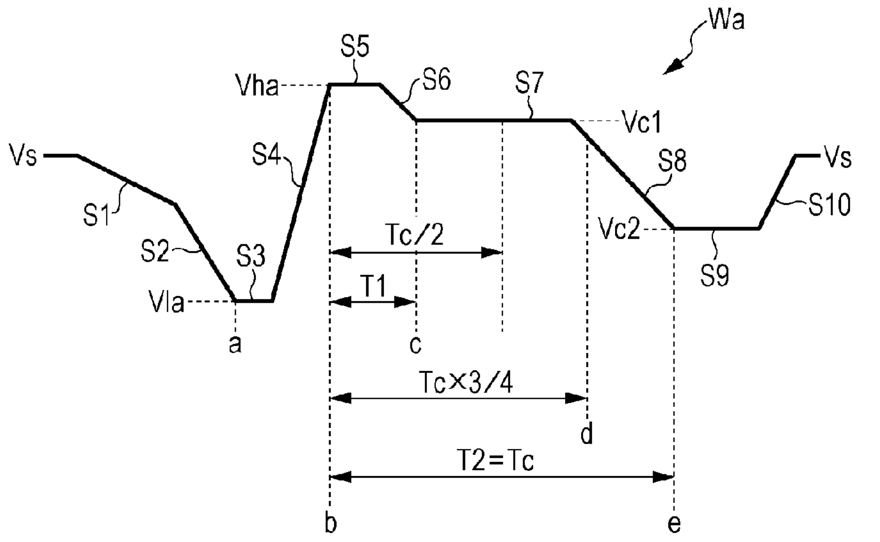
FIG. 3A is a descriptive diagram illustrating a discharge waveform according to an embodiment of the invention.
Figure 3B:
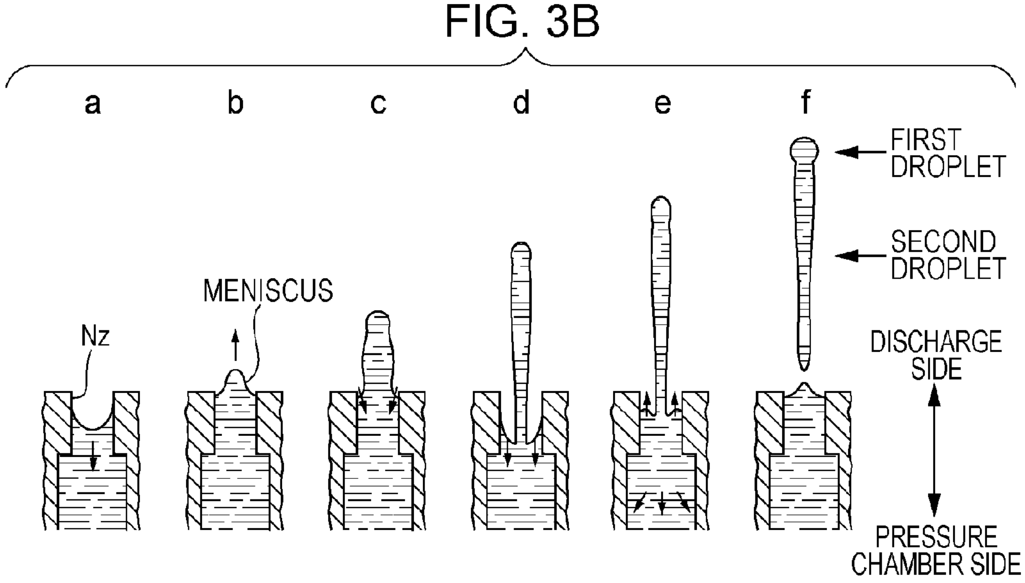
FIG. 3B is a descriptive diagram illustrating movement of a meniscus according to the embodiment.

When a discharge waveform is applied to the piezoelectric element PZT in the head 41, an ink meniscus (a free surface of ink exposed from the nozzle opening) extends from the nozzle Nz in a column shape as shown in FIG. 3B which will be explained later, and the ink column is severed in the vicinity of the nozzle Nz so that an ink droplet flies toward the medium S. At this time, if the behavior of the meniscus is unstable or the ink column is severed at an inappropriate timing, there is a case in which a minute ink droplet is generated following the severed ink column (main ink droplet).

Because the weight of a minute ink droplet is smaller and the velocity of discharge of a minute ink droplet is also smaller in comparison with the main ink droplet, the minute ink droplet is likely to lose its velocity due to air resistance while flying toward the medium S. Because of this, there is a case in which the minute ink droplet does not land on the medium S, but floats in the air as mist and adheres to a nozzle opening surface 41*a* of the head 41.

Further, as described above, in the printer 1 of this embodiment, since a resin ink is discharged onto the ink non-absorptive medium S, it is necessary to dry the resin ink that has landed on the medium S so as to prevent the resin ink from flowing on the medium S. Accordingly, the high-temperature heater 51 is provided in the printer 1 to heat the medium S. Due to the heat of the heater 51, an ambient temperature within the printer 1 is raised (for example, raised to 40° C.) so that the temperature of ink in the head 41 is also raised (for example, raised to 50° C.) The viscosity of ink is lowered as the temperature thereof becomes higher. If the viscosity of ink is excessively lowered (for example, if the viscosity of ink is equal to or less than 1.7 mPa·s at 50° C.), a meniscus that extends from the nozzle Nz in a column shape becomes longer (pulling a long tail), whereby a minute ink droplet is likely to be generated.

Furthermore, in the printer 1 of this embodiment, the nozzle opening surface 41*a* of the head 41 is heated due to the heat from the high-temperature heater 51, radiant heat from the medium S, and the like. For example, in the case where a surface temperature of the medium S is set to 45° C. to 60° C., the temperature of the nozzle opening surface 41*a* is raised to 40° C. to 55° C.

Accordingly, when ink mist adheres to the nozzle opening surface 41*a*, the ink having adhered thereto is dried on the high-temperature nozzle opening surface 41*a* and is firmly adhered to the nozzle opening surface 41*a*. Moreover, the printer 1 of this embodiment uses a resin ink so as to enhance the rub resistance of an image printed on the ink non-absorptive medium S. Accordingly, ink that has adhered to the nozzle opening surface 41*a* and has been dried forms a resin film, thereby making it difficult to remove the ink from the nozzle opening surface 41*a*. In addition, in the case where ink in which the amount of a moisturizing agent is reduced is used, for example, in order to dry the ink more quickly, the ink is more likely to be dried on the nozzle opening surface 41*a* and is firmly adhered to the nozzle opening surface 41*a*.

As a result, there arises a risk such that the ink is firmly adhered to the nozzle opening surface 41*a* of the head 41 and the openings of the nozzles Nz are consequently blocked by the adhered ink. This prevents ink droplets from being discharged through the nozzles Nz. For example, a defined amount of ink is not discharged through the nozzles Nz, the direction of flying of ink droplets discharged through the nozzles Nz is deviated, and in the worst case, the nozzles Nz are completely blocked by the adhered ink so that the ink cannot be discharged at all; these failures result in fault discharging of ink so that image quality of the printed image is deteriorated. In addition, the ink that is firmly adhered to the nozzle opening surface 41*a* in this manner cannot be removed by a regular flushing process or a regular ink sucking process. Accordingly, in the printer 1 of this embodiment, to reduce the amount of ink that adheres to the nozzle opening surface 41*a* of the head 41 is a problem to be solved.

The printer 1 of this embodiment is characterized in that a resin ink whose viscosity is equal to or greater than 2.1 mPa·s at 50° C. is used, as described above. By using a resin ink whose viscosity is larger at a high temperature (50° C.) than a general resin ink in this manner, it is possible to suppress the lengthening (ink tail pulling) of a meniscus that extends in a column shape from the nozzle Nz even if the ambient temperature within the printer 1 is raised by the heat of the heater 51 and the temperature of ink within the head 41 is consequently raised. Accordingly, the generation of minute droplets is suppressed so that the amount of ink that adheres to the nozzle opening surface 41*a* of the head 41 can be reduced.

In addition, in the printer 1 of this embodiment, in order to suppress the generation of minute droplets, as shown in FIG. 3A which will be explained later, the head 41 is driven using the discharge waveform Wa that expands the pressure chamber 411 in two steps after having expanded and contracted the pressure chamber 411 in the head 41. Hereinafter, the discharge waveform Wa used in the printer 1 of this embodiment will be described in detail.

Discharge Waveform Wa

The discharge waveform Wa is a waveform that is applied to the piezoelectric element PZT so as to discharge an ink droplet through the nozzle Nz. Applying the discharge waveform Wa to the piezoelectric element PZT changes an amount of flexure of the piezoelectric element PZT, which causes the pressure chamber 411 to expand and contract so that an ink droplet is discharged through the nozzle Nz communicating with the pressure chamber 411.

Figure 4A:
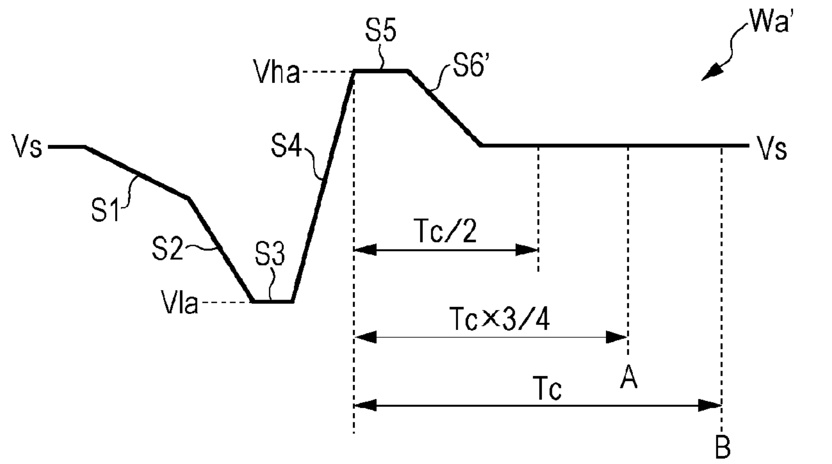
FIG. 4A is a descriptive diagram illustrating a discharge waveform of a comparative example.
Figure 4B:
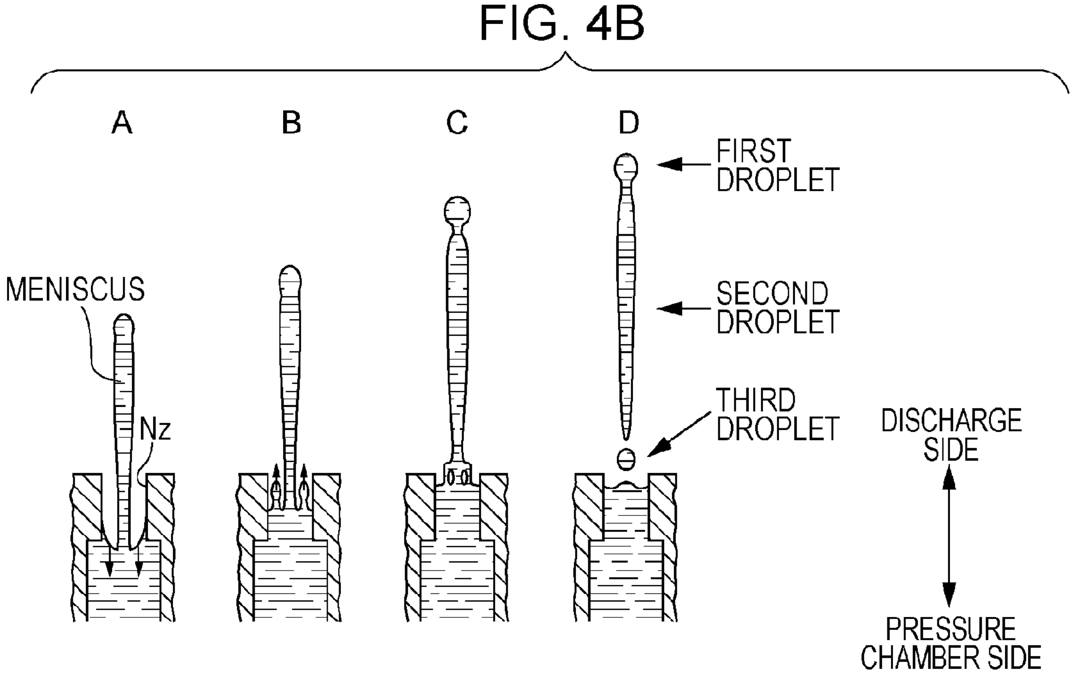
FIG. 4B is a descriptive diagram illustrating movement of a meniscus of the comparative example.

FIG. 3A is a diagram for explaining the discharge waveform Wa of this embodiment, and FIG. 3B is a diagram for explaining the movement of a meniscus when the discharge waveform Wa of this embodiment is applied to the piezoelectric element PZT. FIG. 4A is a diagram for explaining a discharge waveform Wa' of a comparative example, and FIG. 4B is a diagram for explaining the movement of a meniscus when the discharge waveform Wa' of the comparative example is applied to the piezoelectric element PZT.

First, the discharge waveform Wa of this embodiment (FIG. 3A) will be explained below.

The "discharge waveform Wa" of this embodiment includes: a "first waveform portion S1 (first expansion element)" that lowers a potential from a standby potential Vs between a maximum potential Vha and a minimum potential V1a at a moderate slope; a "second waveform portion S2 (first expansion element)" that lowers the potential from an end terminal potential of the first waveform portion S1 to the minimum potential V1a in a steeper slope than the first waveform portion S1; a "third waveform portion S3" that holds the minimum potential V1a; a "fourth waveform portion S4 (contraction element)" that raises the potential from the minimum potential V1a up to the maximum potential Vha in a steep slope; a "fifth waveform portion S5" that holds the maximum potential Vha; a "sixth waveform portion S6 (second expansion element)" that lowers the potential from the maximum potential Vha to a first intermediate potential Vc1 which is relatively lower than the maximum potential Vha; a "seventh waveform portion S7 (connection element for connecting an end terminal of the sixth waveform portion with a start terminal of an eighth waveform portion at the same potential)" that holds the first intermediate potential Vc1; the "eighth waveform portion S8 (third expansion element)" that lowers the potential from the first intermediate potential Vc1 down to a second intermediate potential Vc2 which is relatively lower than the first intermediate potential Vc1; a "ninth waveform portion S9" that holds the second intermediate potential Vc2; and a "tenth waveform portion S10" that raises the potential from the second intermediate potential Vc2 to the standby potential Vs.

Taking a volume of the pressure chamber 411 when the standby potential Vs is applied as a reference volume, the pressure chamber 411 expands when the potential is lowered than the standby potential Vs, whereas the pressure chamber 411 contracts when the potential is raised higher than the standby potential Vs. When the standby potential Vs is applied, a meniscus of the nozzle Nz is located at an opening border of the nozzle Nz. Further, a time period from a potential application end of the fourth waveform portion S4 to a potential application end of the sixth waveform portion S6 is called a first time T1, and a time period from the potential application end of the fourth waveform portion S4 to a potential application end of the eighth waveform portion S8 is called a second time T2. In the discharge waveform Wa of this embodiment, the first time T1 is set to be shorter than half of a natural vibration cycle Tc of ink within the pressure chamber (T1<Tc×½), and the second time T2 is set to be equal to the natural vibration cycle Tc of ink within the pressure chamber (T2=Tc).

The natural vibration cycle Tc of ink within the pressure chamber is a value determined depending on the shapes of the nozzle Nz and the chamber 411, or the like, and can be expressed by the following equation (1).

$$Tc=2\pi\sqrt{[\{(Mn\times Ms)/(Mn+Ms)\}\times Cc]} \quad (1)$$

In the equation (1), Mn represents the inertance of the nozzle Nz, Ms represents the inertance of the ink supply channel 413, and Cc represents the compliance of the pressure chamber 411 (indicating change in volume per unit pressure, and degree of softness). In the equation (1), the inertance M indicates mobility of ink in an ink channel, and takes a value of the mass of ink per unit cross-section area.

When the density of ink is taken as ρ, a cross-section area of a surface orthogonal to a flow direction of the ink in the channel is taken as S, and the length of the channel is taken as L, the inertance M can be approximated by the following equation (2).

$$\text{Inertance } M=(\text{density } \rho\times\text{length } L)/\text{cross-section area } S \quad (2)$$

Note that the Tc is not limited to the above equation (1), and may take any natural vibration cycle as long as it corresponds to the pressure chamber 411.

First, when the first waveform portion S1 and the second waveform portion S2 are applied to the piezoelectric element PZT, the pressure chamber 411 expands to a volume beyond the reference volume so that the pressure in the ink within the pressure chamber 411 decreases. This causes the meniscus of the nozzle Nz to be sucked into the pressure chamber side with respect to the nozzle opening border of the nozzle Nz, as shown in "a" of FIG. 3B. Subsequently, the state of expansion of the pressure chamber 411 is held by the third waveform portion S3. In addition, since the meniscus performs free vibration during the third waveform portion S3 being applied, it is possible to adjust the state of the meniscus when the subsequent fourth waveform portion S4 is to be applied by adjusting the potential application time period of the third waveform portion S3. Accordingly, it is possible to adjust the weight of a droplet discharged through the nozzle Nz, the discharge velocity of the ink droplet, and the like.

Next, when the fourth waveform portion S4 is applied to the piezoelectric element PZT, the pressure chamber 411 rapidly contracts so that the pressure in the ink within the pressure chamber 411 is raised. This causes the meniscus to be pushed out to the discharge side (the medium S side) being formed in a column shape from the nozzle opening border, as shown in "b" of FIG. 3B. Then, the state of contraction of the pressure chamber 411 is held by the fifth waveform portion S5, during which the ink column extends toward the discharge side.

Next, when the sixth waveform portion S6 is applied to the piezoelectric element PZT, the pressure chamber 411 slightly expands so as to be in a state in which the volume thereof is slightly contracted relative to the reference volume (in other words, the chamber has slightly expanded since the time when the fifth waveform portion S5 was applied). Accordingly, as shown in "c" of FIG. 3B, because a force strong enough to cause the central portion of the meniscus to extend toward the discharge side is exerted thereon, the central portion of the meniscus attempts to extend to the discharge side as the ink column; meanwhile, at the perimeter portion of the meniscus, a force to cause the meniscus to move toward the discharge side is suppressed, and the perimeter portion is sucked into the pressure chamber side. By sucking the perimeter portion of the meniscus into the pressure chamber side in the manner described above, the force that attempts to move the ink column to the discharge side as a whole can be controlled, thereby making it possible to adjust the weight of the ink droplet discharged through the nozzle Nz.

Moreover, in the discharge waveform Wa of this embodiment, the first time T1 which is a time period from the potential application end of the fourth waveform portion S4 to the potential application end of the sixth waveform portion S6 is set to be shorter than half of the natural vibration cycle Tc (the second time T2) of the ink within the pressure chamber (T1<Tc×½). In other words, the discharge waveform Wa is set so that the pressure chamber 411 slightly expands while the meniscus is moving toward the discharge side. This makes it possible to suppress the force that attempts to move the perimeter portion of the meniscus toward the discharge side, and to damp the residual vibration generated in the meniscus by the fourth waveform S4 to a small extent in comparison with an effect of the eighth waveform portion S8. Accordingly, it is possible to prevent the perimeter portion of the meniscus from largely rising as shown in "B" of FIG. 4B, which will be explained later. On the other hand, if the first time T1 is set to be approximately equal to half of the natural vibration cycle Tc of the ink within the pressure chamber ($T1 \approx Tc \times 1/2$), the residual vibration of the meniscus will be excited.

Subsequently, the seventh waveform portion S7 maintains the pressure chamber 411 in a state in which the volume thereof is slightly contracted in comparison with the reference volume, during which the perimeter portion of the meniscus is further sucked into the pressure chamber side whereas the central portion of the meniscus (ink column) attempts to further extend toward the discharge side due to inertia. Then, at the time when the three fourths of the natural vibration cycle Tc of the ink within the pressure chamber has elapsed since the potential application end of the fourth waveform portion S4, the perimeter portion of the meniscus is most sucked into the pressure chamber side as shown in "d" of FIG. 3B. Thereafter, the direction of the residual vibration is changed, and the perimeter portion of the meniscus begins to move toward the discharge side.

In the discharge waveform Wa of this embodiment, the second time T2 which is a time period from the potential application end of the fourth waveform portion S4 to the potential application end of the eighth waveform portion S8 is set to be equal to the natural vibration cycle Tc of the ink within the pressure chamber. This makes it possible to expand the pressure chamber 411 by the eighth waveform portion S8 during the perimeter portion of the meniscus moving toward the discharge side. Accordingly, as shown "e" of FIG. 3B, it is possible to suppress the force that attempts to move the perimeter portion of the meniscus toward the discharge side, and to damp the residual vibration generated in the meniscus. This makes it possible to prevent the perimeter portion of the meniscus from largely rising as shown in "B" of FIG. 4B, which will be explained later.

Finally, as shown in "f" of FIG. 3B, the ink column is severed from the meniscus and flies as an ink droplet toward the medium S. It is to be noted that there is a case in which the ink droplet (ink column) is separated into a main droplet (first droplet) as a leading portion and a satellite droplet (second droplet) as a trailing portion during the ink droplet flying toward the medium S. Further, with the discharge waveform Wa of this embodiment, the residual vibration of the meniscus is damped by the sixth waveform portion S6 and the eighth waveform portion S8 so that the perimeter portion of the meniscus is prevented from largely rising as shown in "B" of FIG. 4B, which will be explained later. Therefore, it is prevented from occurring that the perimeter portion of the meniscus largely rises and follows the trailing end of the ink column so as to generate minute droplets (third and subsequent droplets), as show in "C" and "D" of FIG. 4B which will be explained later.

Meanwhile, the pressure chamber 411 having been expanded to be slightly larger than the reference volume by the eighth waveform portion S8 has its state of expansion being maintained by the ninth waveform portion S9. Thereafter, the pressure chamber 411 is contracted by the tenth waveform portion S10 to return to the reference volume. Note that after the ink column is severed from the meniscus ("f" of FIG. 3B), the meniscus moves toward the pressure chamber 411 side in reaction to the severing of the ink column. By adjusting the length of the ninth waveform portion S9 so that the pressure chamber 411 is contracted at this timing (in other words, so that the tenth waveform portion S10 is generated), the movement of the meniscus toward the pressure chamber side can be suppressed. That is, it is possible to damp the reaction of the meniscus due to the severing of the ink column. Accordingly, it is possible to apply the subsequent discharge waveform Wa to the piezoelectric element PZT during the behavior of the meniscus being stable, whereby an ink droplet can be stably discharged through the nozzle Nz.

Next, the waveform Wa' of the comparative example (FIG. 4A) will be explained below.

In the waveform Wa' of the comparative example, the first waveform portion S1 and the second waveform portion S2 expand the pressure chamber 411, then the fourth waveform portion S4 contracts the pressure chamber 411, thereafter, the pressure chamber 411 is made to return to the reference volume by expanding the pressure chamber 411 once with a sixth waveform portion S6'. That is, after expanding and contracting the pressure chamber 411, the discharge waveform Wa of this embodiment expands the pressure chamber 411 in two steps, whereas the discharge waveform Wa' of the comparative example expands the pressure chamber 411 just once.

To be more specific, in the discharge waveform Wa' of the comparative example, after the meniscus is pushed out from the opening border of the nozzle Nz to the discharge side as an ink column by the fourth waveform portion S4 ("b" of FIG. 3B), the sixth waveform portion S6' is generated at the same timing as in the discharge waveform Wa of this embodiment so as to adjust the weight of the ink droplet. Accordingly, like in "c" of FIG. 3B, the central portion of the meniscus attempts to extend toward the discharge side as the ink column, whereas the perimeter portion of the meniscus is sucked into the pressure chamber side since a force that attempts to move the perimeter portion to the discharge side is suppressed.

However, with the discharge waveform Wa' of the comparative example, as the potential is lowered from the maximum potential Vha to the standby potential Vs, the perimeter portion of the meniscus is sucked into the pressure chamber side by a stronger force and for a longer time than in the case of the discharge waveform Wa of this embodiment. Consequently, the force that sucks the perimeter portion of the meniscus into the pressure chamber side becomes stronger, and the residual vibration generated in the meniscus by the fourth waveform portion S4 is excited. Accordingly, as shown in "A" of FIG. 4B, at the time when the three fourths of the natural vibration cycle Tc of the ink within the pressure chamber has elapsed since the potential application end of the fourth waveform portion S4, the perimeter portion of the meniscus is largely sucked into the pressure chamber side. Thereafter, the direction of the residual vibration is changed, and the perimeter portion of the meniscus attempts to move toward the discharge side; however, because the discharge waveform Wa' of the comparative example is not configured to expand the pressure chamber 411 at this timing, the force that moves the perimeter portion of the meniscus to the discharge side cannot be suppressed. As a result, the perimeter portion of the meniscus largely rises, as shown in "B" of FIG. 4B.

As shown in "C" of FIG. 4B, the largely rising perimeter portion follows the trailing end of the ink column, and finally separates into part of the ink column (first and second droplets), minute ink droplets (third and subsequent droplets), and the meniscus as shown in "D" of FIG. 4B. Since the velocity of discharge of the ink column (first and second droplets) is relatively large, the ink column can land on the medium S. However, the weight of ink of the third droplet is small and the velocity of discharge thereof is also small. This raises a risk such that the third droplet loses its velocity halfway and floats in the air as mist so as to adhere to the nozzle opening surface 41*a* of the head 41.

As described above, with the discharge waveform Wa' of the comparative example, the pressure chamber 411 having been contracted by the fourth waveform portion S4 is made to return to the reference volume only by the sixth waveform portion S6'. Due to this sixth waveform portion S6', the perimeter portion of the meniscus is excessively sucked into, as shown in "A" of FIG. 4B. In addition, because the pressure chamber 411 cannot be expanded while the perimeter portion of the meniscus is moving toward the discharge side, the perimeter portion of the meniscus largely rises as shown in "B" of FIG. 4B. As a result, the rising portion of the meniscus follows the trailing end of the ink column, and this following portion is discharged as a third droplet (minute ink droplet).

In contrast, with the discharge waveform Wa of this embodiment, because the pressure chamber 411 is expanded in two steps by the sixth waveform portion S6 and the eighth waveform portion S8, the sixth waveform portion S6 and the eighth waveform portion S8 can be separately designed. In other words, potential, timing, slopes, and the like can be freely designed so that the generation of a minute ink droplet (ink mist) can be suppressed. Accordingly, it is possible to reduce the amount of ink that adheres to the nozzle opening surface 41*a* of the head 41.

Therefore, like in the printer 1 of this embodiment, even in the case where the temperature of the nozzle opening surface 41*a* is raised due to the heater 51 so that ink is likely to be firmly adhered to the nozzle opening surface 41*a*, and the ink having been adhered to the nozzle opening surface 41*a* is difficult to be removed because of the ink being a resin ink, the accumulation of ink on the nozzle opening surface 41*a* is suppressed to a minimum degree. Therefore, it can be prevented from occurring that the accumulated ink blocks the discharge of ink droplets through the nozzles Nz. This makes it possible to discharge a defined amount of ink through the nozzles Nz and to make the discharged ink land on a target position on the medium S, whereby image quality of the printed image is prevented from being deteriorated.

In particular, it is preferable for the discharge waveform Wa to be set so that the second time T2 which is a time period from the potential application end of the fourth waveform portion S4 (contraction element) to the potential application end of the eighth waveform portion S8 (third expansion element) is equal to the natural vibration cycle Tc of ink within the pressure chamber 411 (T2=Tc). Through this, the pressure chamber 411 can be expanded by the eighth waveform portion S8 while the meniscus (perimeter portion) is moving toward the discharge side ("e" of FIG. 3B) so that the force that attempts to move the meniscus towards the discharge side can be suppressed. This makes it possible to damp the residual vibration of the meniscus (to prevent the perimeter portion of the meniscus from rising) and to suppress the generation of a minute ink droplet.

Further, it is preferable for the discharge waveform Wa to be set so that a relationship of $T1<Tc\times½$ holds between the first time T1 and the natural vibration cycle Tc of ink within the pressure chamber 411, where the first time T1 is a time period from the potential application end of the fourth waveform portion S4 (contraction element) to the potential application end of the sixth waveform portion S6 (second expansion element). In other words, it is preferable for the discharge waveform Wa to be set so that the relationship of $T1<T2\times½$ holds between the first time T1 and the second time T2. Through this, the pressure chamber 411 can be expanded by the sixth waveform portion S6 while the meniscus (perimeter portion) is moving toward the discharge side ("c" of FIG. 3B), whereby the force that attempts to move the meniscus toward the discharge side can be suppressed. Accordingly, it is possible to damp the residual vibration of the meniscus (to prevent the perimeter portion of the meniscus from rising) and to suppress the generation of a minute ink droplet.

Figure 5A:
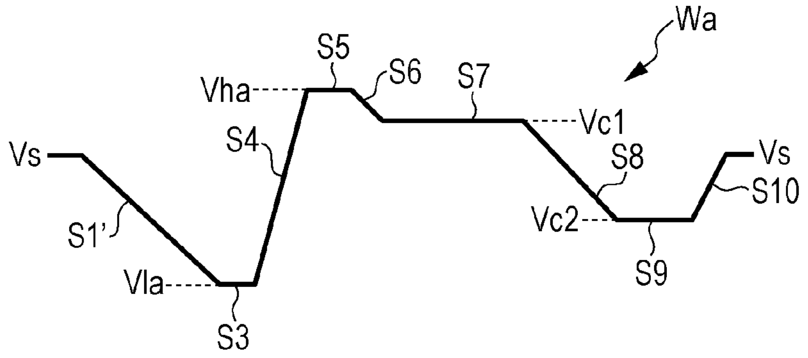
FIGS. 5A and 5B are descriptive diagrams illustrating variations of the discharge waveform according to the embodiment.
Figure 5B:
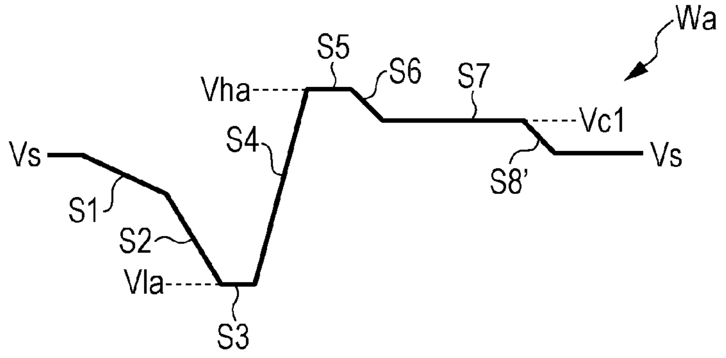

FIGS. 5A and 5B are diagrams for explaining variations of the discharge waveform Wa of this embodiment. In the discharge waveform Wa shown in FIG. 3A, the first waveform portion S1 and the second waveform portion S2 descend from the standby potential Vs at different slopes down to the minimum potential V1a. That is, the pressure chamber 411 having the reference volume is expanded in two steps; however, the invention is not limited thereto. For example, like in the discharge waveform Wa illustrated in FIG. 5A, the pressure chamber 411 having the reference volume may be expanded by a first waveform portion S1' that descends from the standby potential Vs to the minimum potential V1a at a constant slope.

Further, in the discharge waveform Wa shown in FIG. 3A, the eighth waveform S8 descends from the first intermediate potential Vc1 to the second intermediate potential Vc2 which is relatively lower than the standby potential Vs. Therefore, the potential is returned from the second intermediate potential Vc2 to the standby potential Vs by the ninth waveform portion S9 and the tenth waveform portion S10; however, the invention is not limited thereto. For example, like in the discharge waveform Wa illustrated in FIG. 5B, an eighth waveform portion S8' may return the potential from the first intermediate potential Vc1 to the standby potential Vs. In this case, the ninth waveform portion S9 and the tenth waveform portion S10 can be omitted.

Printing Method

Figure 6A:
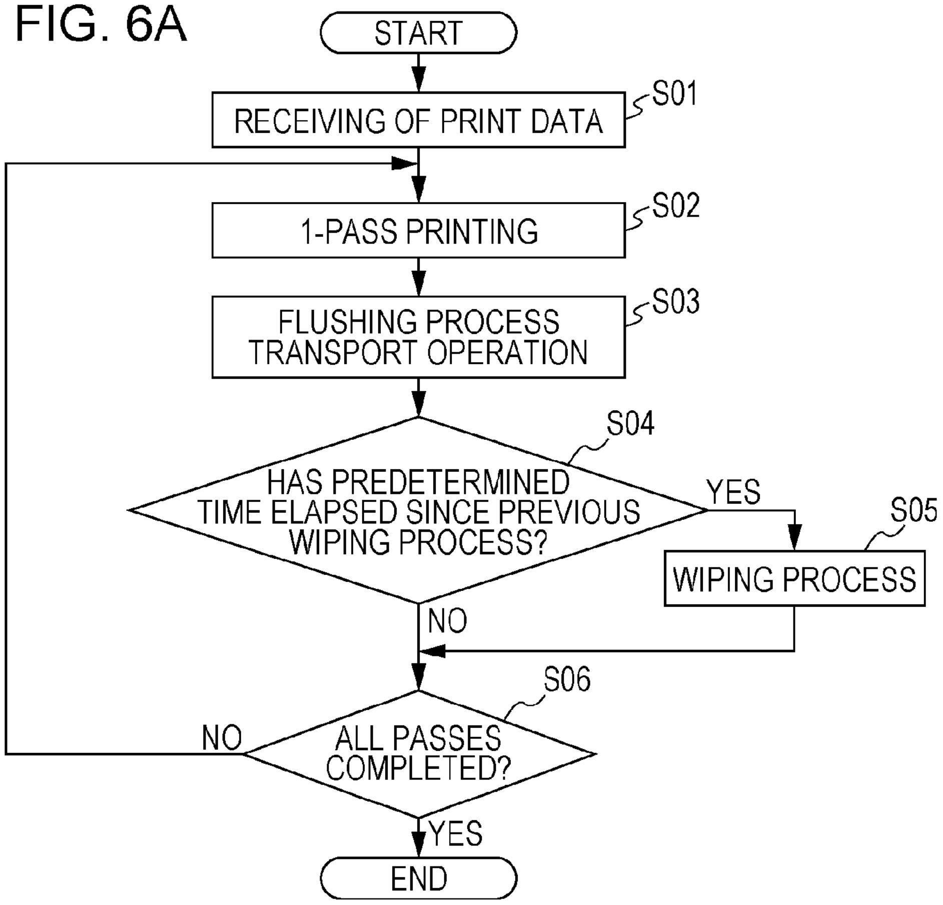
FIG. 6A is a flowchart illustrating a printing method of a printer according to the embodiment.
Figure 6B:
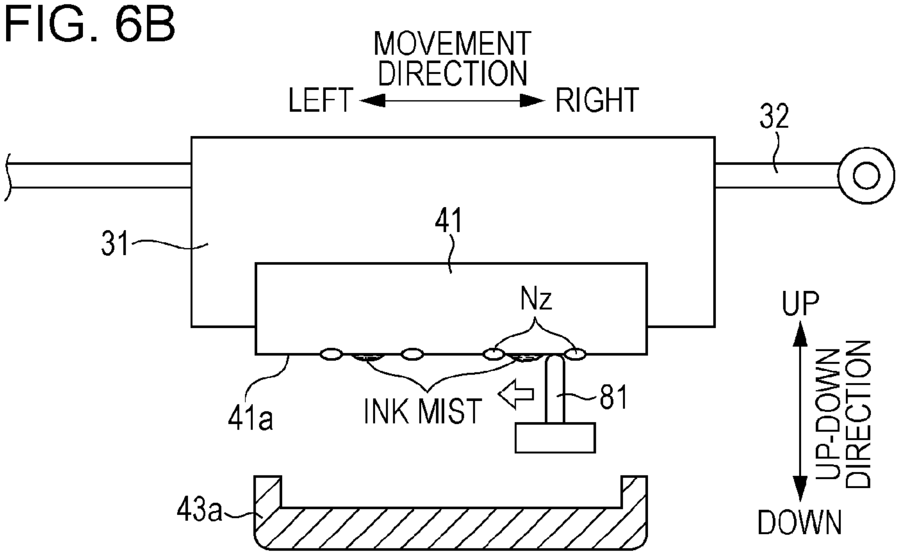
FIG. 6B is a diagram for explaining a wiping process.

FIG. 6A is a flowchart illustrating a printing method of the printer 1 according to this embodiment, and FIG. 6B is a diagram for explaining a wiping process. As shown in FIG. 1A, the printer 1 of this embodiment includes the wiper unit 80. The wiper unit 80 includes a wiping member 81 that is disposed, as shown in FIG. 2B, in the non-print region on the right side in the movement direction, and a movement mechanism (not shown) that moves the wiping member 81. As shown in FIG. 6B, the wiping member 81 is a plate-like member that is capable of making contact with the nozzle opening surface 41*a* of the head 41 and is formed of cloth. Further, the wiping member 81 can move in the moving direction relative to the nozzle opening surface 41*a* of the head 41 while making contact with the nozzle opening surface 41*a*, so as to wipe off foreign objects having adhered to the nozzle opening surface 41*a* such as ink mist, dust, and so on. The material of the wiping member 81 is not limited to cloth, and the wiping member 81 may be formed of, for example, an elastic material such as rubber, or the like. Note that, however, by using cloth for the wiping member 81, the nozzle opening surface 41*a* can be prevented from being scratched. In addition, because the cloth can be exchanged easily, it can be prevented from occurring that the foreign objects that have been wiped off by the wiping member 81 adhere again to the nozzle opening surface 41*a*.

Hereinafter, a specific flow of the printing method in the printer 1 of this embodiment will be described.

First, upon receiving print data from the computer 70 (S01), the controller 10 sets a medium S at a print start position by the transport unit 20, and prints an image (a part thereof) on the medium S by discharging ink droplets through the nozzles Nz provided in the head 41 while moving the head 41, which has been sealed by the cap 44 disposed at a home position (in this case, the non-print region on the right side in the movement direction), to the left side in the movement direction by the carriage 31. In other words, 1-pass printing is performed (S02).

After having performed the 1-pass printing, the controller 10 makes the ink receptor 43*b* disposed in the non-print region on the left side in the movement direction and the nozzle opening surface 41*a* of the head 41 face to each other. Then, while the transport unit 20 is transporting the medium S to the downstream side in the transport direction, the controller 10 performs a "flushing process" as a cleaning process for the head 41 (S03). The flushing process is a process in which ink droplets are forcibly discharged through the nozzles Nz provided in the head 41 toward the ink receptors 43*a*, 43*b*. For example, the ink droplets are forcibly discharged through the nozzles Nz by applying the discharge waveform Wa shown in FIG. 3A a plurality of times to the piezoelectric elements PZT. As a result, ink having been thickened during the 1-pass printing and foreign objects having entered the ink or the nozzles Nz can be discharged through the nozzles Nz so that the clogging of the nozzles Nz can be resolved. Accordingly, printing of the subsequent pass can be performed with the nozzles Nz which is free of clogging.

Next, the controller 10 checks if a predetermined time has elapsed since the previous wiping process (S04). In the case where the predetermined time has not elapsed since the previous wiping process (S04; NO), if a printing pass to be performed remains (S06; NO), the controller 10 again discharges ink droplets through the nozzles Nz while moving the head 41 to the right side in the movement direction so as to print the image (a part thereof) on the medium S (S02), and performs the flushing process and the transport operation (S03). As described earlier, since the printer 1 of this embodiment is provided with the high-temperature heater 51 to prevent a resin ink from flowing on the medium S, the ambient temperature within the printer 1 is higher. Accordingly, the ink solvent is likely to evaporate from the nozzles Nz and the nozzles Nz are likely to be clogged. However, like in this printing method, by performing the flushing operation every printing pass, it is possible to suppress clogging of the nozzles Nz and to suppress deterioration of image quality of the printed image.

Meanwhile, in the case where the predetermined time has elapsed since the previous wiping operation (S04; YES), the controller 10 (equivalent to the control unit) moves the head 41 to the non-print region on the right side in the movement direction and performs the wiping process (S05). Specifically, as shown in FIG. 6B, by moving the wiping member 81 to the left side in the movement direction relative to the nozzle opening surface 41*a* of the head 41 while the wiping member 81 being in contact with the nozzle opening surface 41*a*, foreign objects having adhered to the nozzle opening surface 41*a* (ink mist, dust, and the like) are wiped off. As shown in FIG. 2B, the length in the transport direction of the wiping member 81 is equal to the length in the transport direction of the head 41. Therefore, the wiping member 81 can wipe the whole area of the nozzle opening surface 41*a* by moving once in the movement direction. Then, the controller 10 repeats the above-described series of processes until all the printing passes are completed (S06; YES).

As described above, in the printer 1 of this embodiment, the generation of a minute ink droplet is suppressed by using the discharge waveform Wa configured to expand the pressure chamber 411 in the head 41 in two steps after having expanded and contracted the pressure chamber 411. However, it is difficult to completely prevent ink from adhering to the nozzle opening surface 41*a*. Therefore, it is preferable to perform the wiping process periodically like in this printing method. Through this, it can be prevented from occurring that ink is accumulated on the nozzle opening surface 41*a* and the accumulated ink blocks the discharge of ink droplets through the nozzles Nz.

Note that the invention is not limited to the wiping process being performed periodically, and the wiping process may be performed every printing pass, for example. Further, in this embodiment, the wiping member 81 is moved in the movement direction with respect to the head 41; however, the invention is not limited thereto, and the head 41 may be moved with respect to the wiping member 81 or the wiping member 81 may be moved in the transport direction. Moreover, the wiping members 81 may be disposed in the non-print regions on both sides in the movement direction.

Other Embodiments

The aforementioned embodiment is intended to facilitate understanding of the invention, and does not limit interpretation of the invention in any way. It is needless to say that the invention can be changed or improved without departing from the scope and spirit of the invention and equivalents thereof are included in the invention.

In the aforementioned embodiment (FIG. 6A), although the wiping process is performed every predetermined time, the invention is not limited thereto; the printer 1 may be such that the wiping member 81 is not provided and the wiping process is not performed therein.

In the aforementioned embodiment, the printer 1 is exemplified in which the following two operations are repeated: that is, an operation in which the head 41 discharges ink while moving in the movement direction, and an operation in which the medium S is transported in the transport direction. However, the invention is not limited thereto. For example, a printer that prints a two-dimensional image on a medium using a fixed head that extends along the width length of the medium S and that discharges ink onto the medium S when the medium S passes under the fixed head, may be exemplified. In addition, for example, a printer in which printing is performed in the following manner may also be exemplified: that is, the printer repeats an operation to print an image on a medium S transported to a print region while moving the head in the X direction and an operation to move the head in the Y direction, and thereafter, transports a part of the medium S on which the image has not been printed yet into the print region.

In the aforementioned embodiment, a method in which an ink droplet is discharged through the nozzle Nz by applying a discharge waveform to the piezoelectric element Nz to expand and contract the pressure chamber 411, is exemplified; however, the invention is not limited thereto. For example, a thermal method may be exemplified in which air bubbles are generated in the nozzles using a heating element and ink is discharged through the nozzles by the generated bubbles.

What is claimed is:

1. A printing apparatus comprising:

a head having a nozzle through which ink that contains thermoplastic resin particles and whose viscosity at 50° C. is equal to or greater than 2.1 mPa·s is discharged, pressure chamber provided for the nozzle, and driving element provided for the pressure chamber;

an ink non-absorptive medium;

a heating unit that heats the medium; and a control unit that drives the driving element by applying driving signal thereto to expand and contract the pressure chamber corresponding to the respective driving element so as to discharge ink droplets through the nozzle that communicate with the pressure chamber, wherein a discharge waveform generated by the driving signal includes: a first expansion element that expands the pressure chamber; a contraction element that contracts the pressure chamber having been expanded by the first expansion element; a second expansion element that expands the pressure chamber having been contracted by the contraction element; a third expansion element that further expands the pressure chamber having been expanded by the second expansion element; and a connection element that connects an end terminal of the second expansion element with a start terminal of the third expansion element at the same potential.

2. The printing apparatus according to claim 1, further comprising:

a wiping member that makes contact with a nozzle opening surface of the head in which opening of the nozzle is provided, wherein the control unit removes a foreign object having adhered to the nozzle opening surface by moving the wiping member relative to the nozzle opening surface while the wiping member being in contact with the nozzle opening surface.

3. The printing apparatus according to claim 1, wherein the discharge waveform is set so that a time period from an application end of the contraction element to an application end of the third expansion element is equal to a natural vibration cycle of ink within the pressure chamber.

4. The printing apparatus according to claim 1, wherein the discharge waveform is set so that a relationship of $T1<Tc\times\frac{1}{2}$ holds in which a time period from the application end of the contraction element to an application end of the second expansion element is taken as T1 and the natural vibration cycle of ink within the pressure chamber is taken as Tc.

5. A printing method of printing an image on an ink non-absorptive medium using a head having a nozzle through which ink that contains thermoplastic resin particles and whose viscosity at 50° C. is equal to or greater than 2.1 mPa·s is discharged, pressure chamber provided for the nozzle, and driving element provided for the pressure chamber, comprising:

applying a driving signal to the driving element for generating a discharge waveform that includes a first expansion element that expands the pressure chamber, a contraction element that contracts the pressure chamber having been expanded by the first expansion element, a second expansion element that expands the pressure chamber having been contracted by the contraction element, a third expansion element that further expands the pressure chamber having been expanded by the second expansion element, and a connection element that connects an end terminal of the second expansion element with a start terminal of the third expansion element at the same potential; thereby expanding and contracting the pressure chamber corresponding to the driving element; and discharging an ink droplet through the nozzle communicating with the pressure chamber onto the medium being heated.

* * * * *